(12) United States Patent
Ananth et al.

(10) Patent No.: US 11,245,194 B1
(45) Date of Patent: Feb. 8, 2022

(54) ANTENNA SYSTEM INCLUDING SPHERICAL REFLECTOR WITH METAMATERIAL EDGES

(71) Applicant: SoftBank Corp., Tokyo (JP)

(72) Inventors: Sharath Ananth, Cupertino, CA (US);
Paul Heninwolf, San Carlos, CA (US);
Jean-Laurent Plateau, San Jose, CA (US)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 17/029,904

(22) Filed: Sep. 23, 2020

Related U.S. Application Data

(63) Continuation of application No. 16/986,527, filed on Aug. 6, 2020, now abandoned.

(51) Int. Cl.
*H01Q 15/00* (2006.01)
*H01Q 1/28* (2006.01)
*H01Q 19/12* (2006.01)

(52) U.S. Cl.
CPC .......... *H01Q 15/0086* (2013.01); *H01Q 1/28* (2013.01); *H01Q 19/12* (2013.01)

(58) Field of Classification Search
CPC ...... H01Q 15/00; H01Q 15/0086; H01Q 1/28; H01Q 19/12
See application file for complete search history.

(56) References Cited

U.S. PATENT DOCUMENTS

| 8,743,001 B2 | 6/2014 | Guler |
| 2018/0198214 A1 | 7/2018 | Walker |

| 2019/0260120 A1 | 8/2019 | Khushrushahi et al. |
| 2019/0280391 A1* | 9/2019 | Sanjuan Flores ........ H01Q 3/08 |

FOREIGN PATENT DOCUMENTS

JP 2001196844 A * 7/2001

OTHER PUBLICATIONS

Kwon, Do-Hoon, et al., Reconfigurable Transmissive/Reflective Metamaterial Slab in the Near IR, Department of Electrical Engineering, Department of Physics, 2008, pp. 1-4.
Turpin, Jeremiah P., et al., Reconfigurable and Tunable Metamaterials: A Review of the Theory and Applications, Hindawi Publishing Corporation, vol. 2014, Article ID 429837, 18 pages, http://dx.doi.org/10.1155/2014/429837.

* cited by examiner

*Primary Examiner* — Hoang V Nguyen
(74) *Attorney, Agent, or Firm* — Botos Churchill IP Law LLP

(57) ABSTRACT

An antenna for wireless communication includes a spherical reflector and one or more feeds. The spherical reflector includes an inner portion made of material that reflects radiofrequency (RF) beams, and an outer portion positioned on an edge of the inner portion, the outer portion being made of metamaterials that can be controlled to be reflective of or transparent to RF beams. The one or more feeds are configured to form one or more RF beams reflected off the spherical reflector. In some implementations, the antenna includes one or more processors configured to form one or more RF beams using the one or more feeds, and control at least a part of the outer portion of the spherical reflector to reflect an RF beam of the one or more RF beams or be transparent to the RF beam based on the one or more RF beam.

20 Claims, 7 Drawing Sheets

100

420

420

ANTENNA SYSTEM INCLUDING SPHERICAL REFLECTOR WITH METAMATERIAL EDGES

CROSS REFERENCE TO RELATED APPLICATIONS

This application is a continuation of U.S. application Ser. No. 16/986,527, filed on Aug. 6, 2020, the disclosure of which is incorporated herein by reference.

BACKGROUND

An antenna system in a high-altitude platform (HAP) node, such as a balloon node, may provide coverage to a large area on the ground using multiple access links between the HAP node and user equipment. These links can be formed by transmitting a communication beam from the HAP node toward a discrete user terminal or node or toward some discrete point to cover a general geographic area. In addition, backhaul links can be formed between the HAP node and other HAP nodes and between the HAP node and ground stations. These links may be formed by aiming communication beams of each node pair towards each other. Multiple links may be formed at the HAP node going in different directions.

BRIEF SUMMARY

Aspects of the disclosure provide for an antenna for wireless communication. The antenna includes a spherical reflector and one or more feeds. The spherical reflector includes an inner portion made of material that reflects radiofrequency (RF) beams, and an outer portion positioned on an edge of the inner portion, the outer portion being made of metamaterials that can be controlled to be reflective of or transparent to RF beams. The one or more feeds is configured to form one or more RF beams reflected off the spherical reflector.

In one example, the spherical reflector is less than a hemisphere. In another example, the antenna is part of a high-altitude platform. In a further example, the outer portion of the spherical reflector is controlled using an electrical signal applied to at least a part of the outer portion.

In yet another example, the outer portion of the spherical reflector includes a plurality of metamaterials sections. In this example, each metamaterials section of the plurality of metamaterials sections is optionally independently controllable. Also in this example, the antenna optionally also includes one or more processors configured to form one or more RF beams using the one or more feeds, and control at least a part of the outer portion of the spherical reflector to reflect an RF beam of the one or more RF beams or be transparent to the RF beam based on the one or more RF beam. In this option, the one or more processors are optionally also configured to determine one or more reflective sections of the plurality of metamaterials sections or one or more transparent sections of the plurality of metamaterials sections for each RF beam of the one or more RF beams. Also in this option, the at least a part of the outer portion of the spherical reflector is optionally controlled based on a location of the antenna and one or more target locations. In this additional option, the one or more target locations includes a ground-based terminal and an airborne terminal.

Other aspects of the disclosure provide for a method for controlling an antenna system having a spherical reflector that includes a plurality of metamaterials sections. The method includes determining, by one or more processors, one or more radiofrequency (RF) beams to be formed by the antenna system based on a location of the antenna system of a terminal and a target location; determining, by the one or more processors, one or more reflector sections or one or more transparent sections in the plurality of metamaterials sections for the one or more RF beams; applying, by the one or more processors, an electrical signal to one or more of the plurality of metamaterials sections to cause the one or more of the metamaterials sections to become reflective of or transparent to an RF beam according to the one or more reflector sections and the one or more transparent sections; and causing, by the one or more processors, the antenna system to transmit the one or more RF beams.

In one example, the determining of the one or more reflector sections or the one or more transparent sections is based on a location of the antenna system and one or more target locations. In this example, the one or more target locations optionally includes a ground-based terminal and an airborne terminal. In another example, the electrical signal is a first electrical signal applied at a first point in time, and the method also includes applying, by the one or more processors, a second electrical signal at a second point in time after the first point in time to switch the one or more of the metamaterials sections from reflective to transparent or from transparent to reflective.

In a further example, the method also includes predicting, by the one or more processors, a disruption to a first RF beam based on a location of the one or more reflector sections or the one or more transparent sections corresponding to a second RF beam; and determining, by the one or more processors, to transmit the second RF beam at a given point in time when the first RF beam is not to be transmitted. In yet another example, the spherical reflector is less than a hemisphere. In a still further example, the spherical reflector is a whole sphere.

Further aspects of the disclosure provide for a non-transitory computer readable medium on which instructions are stored. The instructions, when executed by one or more processors in a high-altitude platform (HAP) node, cause the one or more processors to perform a method for controlling an antenna system. The method includes determining one or more radiofrequency (RF) beams to be formed by the antenna system based on a location of the HAP and a target location, the antenna system including a spherical reflector including a plurality of metamaterials sections; determining one or more reflector sections or one or more transparent sections in the plurality of metamaterials sections for the one or more RF beams; applying an electrical signal to one or more of the plurality of metamaterials sections to cause the one or more of the metamaterials sections to become reflective of or transparent to an RF beam according to the one or more reflector sections and the one or more transparent sections; and causing, the antenna system to transmit the one or more RF beams.

In one example, the electrical signal is a first electrical signal applied at a first point in time, and the method also includes applying a second electrical signal at a second point in time after the first point in time to switch the one or more of the plurality of metamaterials sections from reflective to transparent or from transparent to reflective. In another example, the method also includes predicting a disruption to a first RF beam based on a location of the one or more reflector sections or the one or more transparent sections corresponding to a second RF beam; and determining to transmit the second RF beam at a given point in time when the first RF beam is not to be transmitted.

DETAILED DESCRIPTION

Overview

Figure 1:
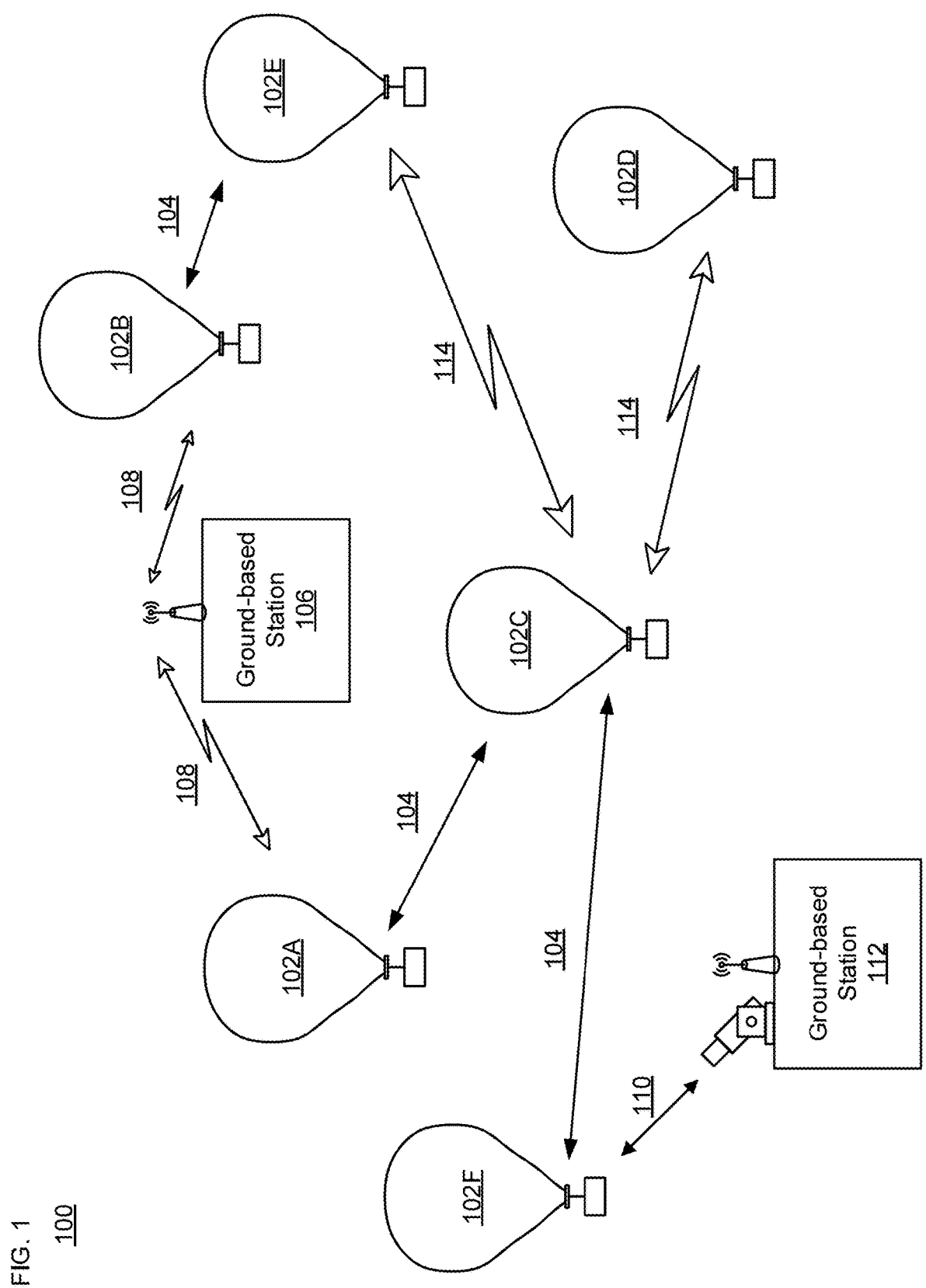
FIG. 1 is a functional diagram of an example system in accordance with aspects of the technology.

The technology relates to an antenna system that includes metamaterials configured to switch between reflecting an RF beam or allowing an RF beam to pass through depending on an electrical signal. In particular, portions of a reflector of the antenna system may be comprised of metamaterials. Using this type of metamaterial may make it possible to configure a spherical reflector to cover a larger angular area. For example, the spherical reflector including the metamaterials may be used to generate beams more than 50 elevational degrees away from a boresight of the antenna system, such as 70-80 elevational degrees away. The spherical reflector may be part of a high-altitude platform (HAP) terminal that provides access or backhaul coverage to a geographic area.

The antenna system may include a spherical reflector and one or more feeds. An inner portion of the spherical reflector may be a reflective portion that is made of a material that reflects RF beams and an outer portion arranged on the edge of the inner portion may be made of metamaterials that can be reflective or transparent to RF beams. The outer portion may comprise a plurality of sections that may be controlled independently of each other. The one or more feeds may be configured to emit one or more RF beams to be reflected off the spherical reflector. The one or more feeds may electronically and/or physically steer the one or more RF beams.

One or more processors may be configured to direct the one or more feeds to form RF beams based on a location of the antenna system and one or more target locations. The one or more target locations may include locations in the geographic area or locations in the air. In particular, the one or more target locations may include locations of user equipment or terrestrial terminals in the geographic area or locations of airborne terminals. The one or more processors may also be configured to apply an electrical signal to at least a section of the outer portion of metamaterials based on the RF beams to be formed by the one or more feeds. Namely, the one or more processors may determine one or more reflector sections and/or one or more transparent sections for each RF beam to be formed. The electrical signal may be applied to the at least a section of the outer portion to cause the metamaterials in the section of the outer portion to become transparent when the corresponding RF beam is to be transmitted. At a later time, when the section of the outer portion is supposed to be a reflector section, the electrical signal may be applied to cause the metamaterials in the section to become reflective.

The technology described herein may create an RF antenna system that has a wider range of coverage, such as an angular coverage area of greater than 100 elevational degrees (>±50 elevational degrees). Fewer moving parts may be used for the RF antenna system, which may lower the possible pointing errors of RF beams. In addition, a greater capacity for electronic steering means less need for repositioning the reflector, allowing for providing more continuous high gain. A larger geographic area may therefore be served by a single HAP terminal equipped with such an RF antenna system.

Example Networks

FIG. 1 depicts an example system 100 in which a fleet of balloons or other high-altitude platforms described above may be used. This example should not be considered as limiting the scope of the disclosure or usefulness of the features described herein. System 100 may be considered a balloon network. In this example, balloon network 100 includes a plurality of devices, such as balloons 102A-F as well as ground-based stations 106 and 112. Balloon network 100 may also include a plurality of additional devices, such as various devices supporting a telecommunication service (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ freespace optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities. In one example using LTE communication, the base stations may be Evolved Node B (eNodeB) base stations. In another example, they may be base transceiver station (BTS) base stations. These examples are not limiting.

In some examples, the links may not provide a desired link capacity for HAP-to-ground communications. For instance, increased capacity may be desirable to provide backhaul links from a ground-based gateway. Accordingly, an example network may also include balloons, which could provide a high-capacity air-ground link between the various balloons of the network and the ground base stations. For example, in balloon network 100, balloon 102F may be configured to directly communicate with station 112.

Like other balloons in network 100, balloon 102F may be operable for communication (e.g., RF or optical) with one or more other balloons via link(s) 104. Balloon 102F may also be configured for free-space optical communication with ground-based station 112 via an optical link 110. Optical link 110 may therefore serve as a high-capacity link (as compared to an RF link 108) between the balloon network 100 and the ground-based station 112. Balloon 102F may additionally be operable for RF communication with ground-based stations 106. In other cases, balloon 102F may only use an optical link for balloon-to-ground communications.

The balloon 102F may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of HAPs (e.g., drones, airplanes, airships, etc.) in addition to, or as an alternative to, a ground based communication link. In some embodiments, a balloon may communicate with a satellite or a high-altitude platform via an optical or RF link. However, other types of communication arrangements are possible.

As noted above, the balloons 102A-F may collectively function as a mesh network. More specifically, since balloons 102A-F may communicate with one another using free-space optical links or RF links, the balloons may collectively function as a free-space optical or RF mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. Balloon network 100 may also implement station-keeping functions using winds and altitude control or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. For instance, the balloons may move in response to riding a wind current, or may move in a circular or other pattern as they station keep over a region of interest.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Other than balloons, other high-altitude platforms, such as drones, may fly routes in an autonomous manner, carry cameras for aerial photography, and transport goods from one place to another. The terms "unmanned aerial vehicle (UAV)" and "flying robot" are often used as synonyms for a drone. The spectrum of applications is broad, including aerial monitoring of industrial plants and agriculture fields as well as support for first time responders in case of disasters. For some applications, it is beneficial if a team of drones rather than a single drone is employed. Multiple drones can cover a given area faster or take photos from different perspectives at the same time.

The balloons of FIG. 1 may be high-altitude balloons that are deployed in the stratosphere. As an example, in a high-altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 2:
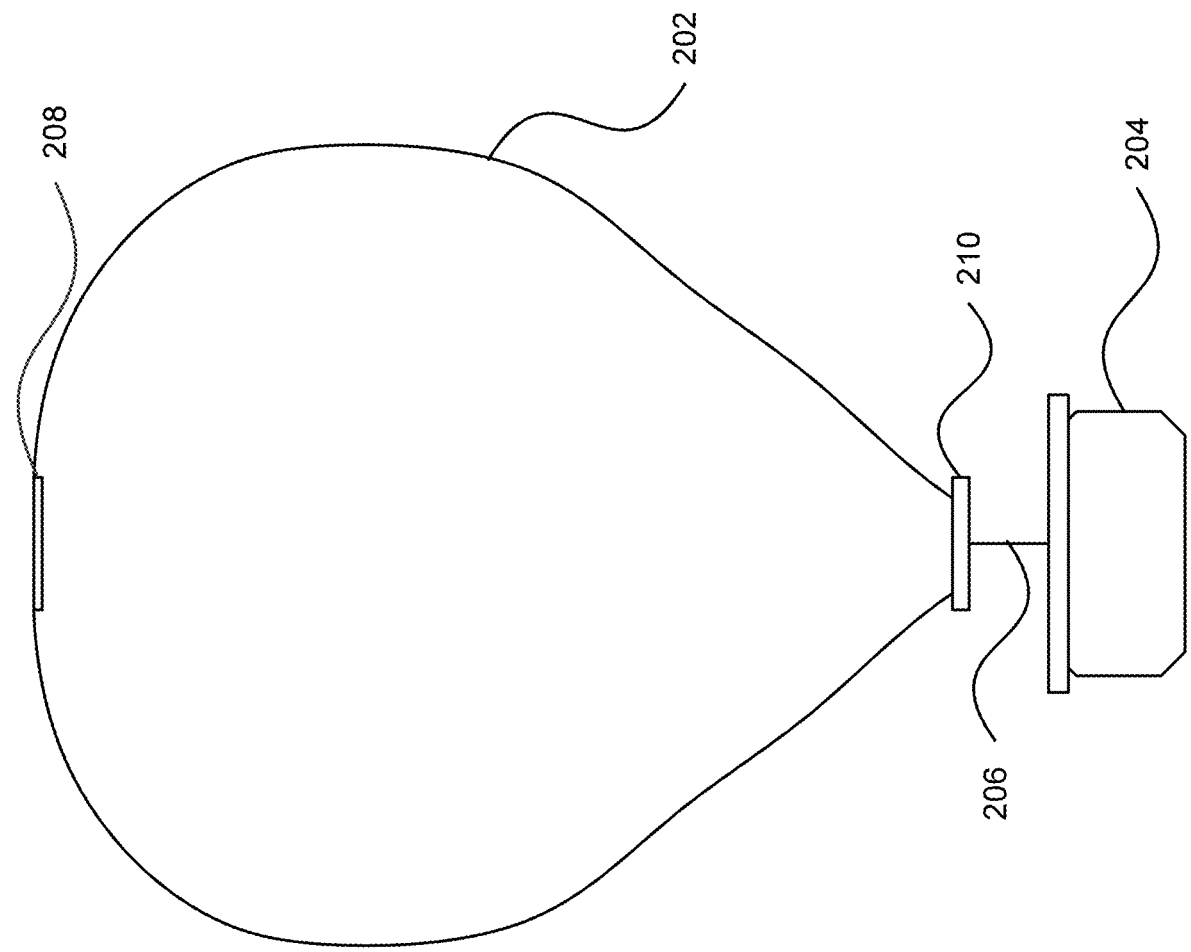
FIG. 2 illustrates a balloon configuration in accordance with aspects of the technology.

In an example configuration, the high altitude balloon platforms include an envelope and a payload, along with various other components. FIG. 2 is one example of a high-altitude balloon 200, which may represent any of the balloons of FIG. 1. As shown, the example balloon 200 includes an envelope 202, a payload 204 and a coupling member (e.g., a down connect) 206 therebetween. At least one gore panel forms the envelope, which is configured to maintain pressurized lifting gas therein. For instance, the balloon may be a superpressure balloon. A top plate 208 may be disposed along an upper section of the envelope, while a base plate 210 may be disposed along a lower section of the envelope opposite the top place. In this example, the coupling member 206 connects the payload 204 with the base plate 210.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
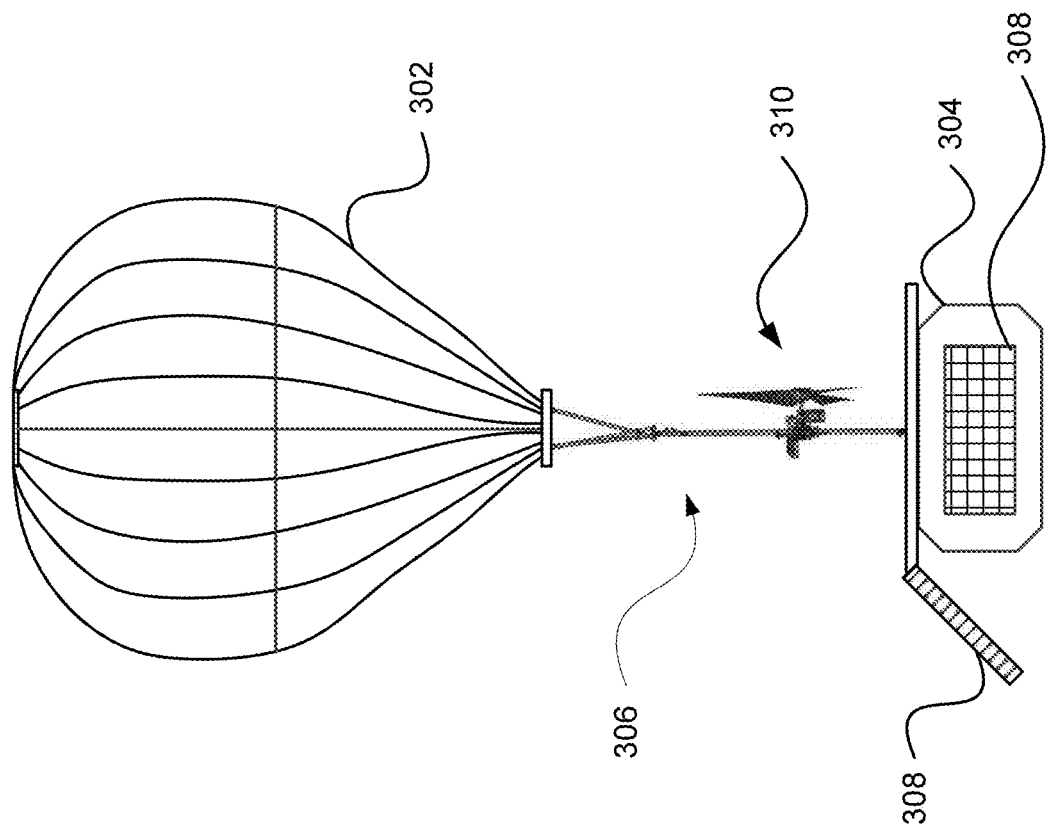
FIG. 3 is an example of a balloon platform with lateral propulsion in accordance with aspects of the technology.

In order to change lateral positions or velocities, the platform may include a lateral propulsion system. FIG. 3 illustrates one example configuration 300 of a balloon platform with propeller-based lateral propulsion, which may represent any of the balloons of FIG. 1. As shown, the example 300 includes an envelope 302, a payload 304 and a down connect member 306 disposed between the envelope 302 and the payload 304. Cables or other wiring between the payload 304 and the envelope 302 may be run within the down connect member 306. One or more solar panel assemblies 308 may be coupled to the payload 304 or another part of the balloon platform. The payload 304 and the solar panel assemblies 308 may be configured to rotate about the down connect member 306 (e.g., up to 360° rotation), for instance to align the solar panel assemblies 308 with the sun to maximize power generation. Example 300 also illustrates a lateral propulsion system 310. While this example of the lateral propulsion system 310 is one possibility, the location could also be fore and/or aft of the payload section 304, or fore and/or aft of the envelope section 302, or any other location that provides the desired thrust vector.

Example Systems

Figure 4:
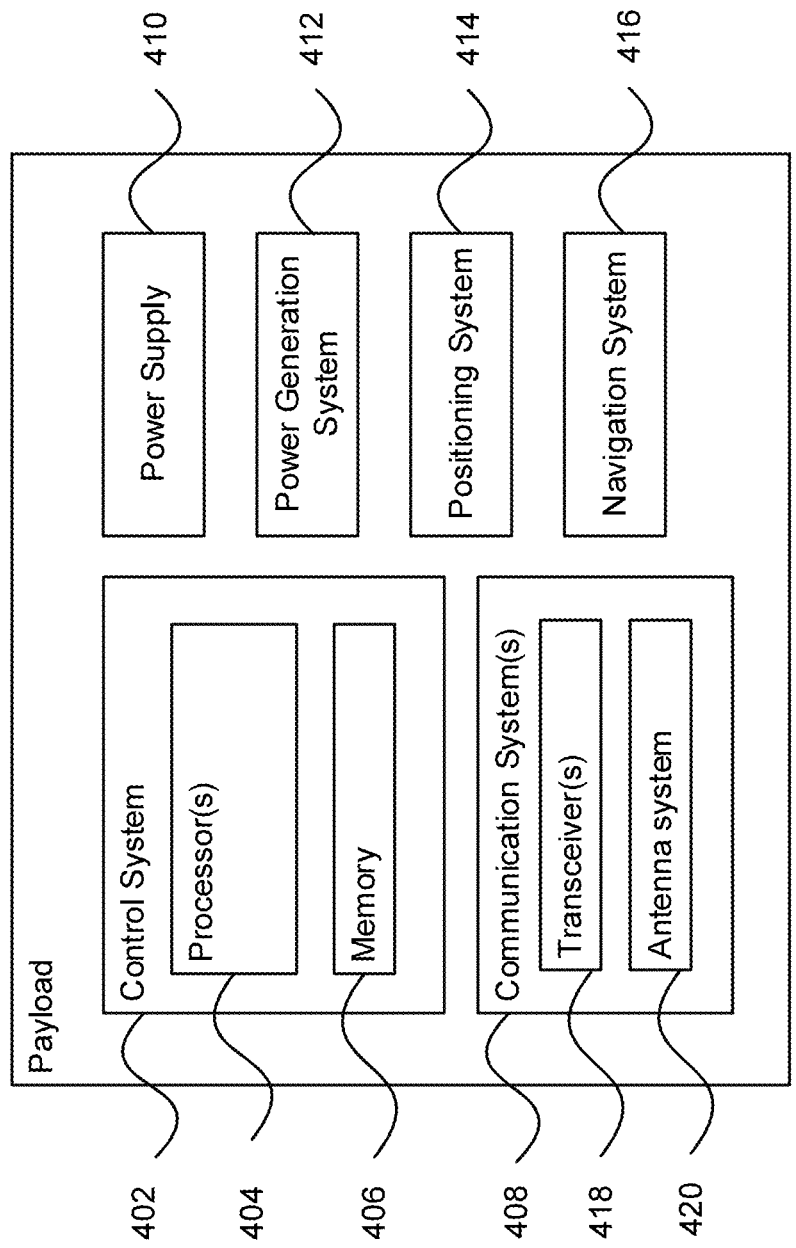
FIG. 4 is an example payload arrangement in accordance with aspects of the technology.

According to one example shown in FIG. 4, a payload 400 of a balloon platform includes a control system 402 having one or more processors 404 and on-board data storage in the form of memory 406. Memory 406 stores information accessible by the processor(s) 404, including instructions that can be executed by the processors. The memory 406 also includes data that can be retrieved, manipulated or stored by the processor. The memory can be of any non-transitory type capable of storing information accessible by the processor, such as a hard-drive, memory card (e.g., thumb drive or SD card), ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 404 in accordance with the instructions.

The one or more processors 404 can include any conventional processors, such as a commercially available CPU. Alternatively, each processor can be a dedicated component such as an ASIC, controller, or other hardware-based processor. Although FIG. 4 functionally illustrates the processor(s) 404, memory 406, and other elements of the control system 402 as being within the same block, the system can actually comprise multiple processors, computers, computing devices, and/or memories that may or may not be stored within the same physical housing. For example, the memory can be a hard drive or other storage media located in a housing different from that of the control system 402. Accordingly, references to a processor, computer, computing device, or memory will be understood to include references to a collection of processors, computers, computing devices, or memories that may or may not operate in parallel.

The payload 400 may also include various other types of equipment and systems to provide a number of different functions. For example, as shown the payload 400 includes one or more communication systems 408, which may transmit signals via RF and/or optical links as discussed above. By way of example only, the communication system 408 may provide LTE or other telecommunications services. The communication system(s) 408 may include communication components such as one or more transmitters and receivers (or transceivers 418) and an antenna system 420 having one or more antennas. The one or more processors 404 may control the entire communication system 408.

Returning to FIG. 4, the payload 400 is illustrated as also including a power supply 410 to supply power to the various components of balloon. The power supply 410 could include one or more rechargeable batteries or other energy storage systems like capacitors or regenerative fuel cells. In addition, the payload 400 may include a power generation system 412 in addition to or as part of the power supply. The power generation system 412 may include solar panels, stored energy (hot air), relative wind power generation, or differential atmospheric charging (not shown), or any combination thereof, and could be used to generate power that charges and/or is distributed by the power supply 410.

The payload 400 may additionally include a positioning system 414. The positioning system 414 could include, for example, a global positioning system (GPS), an inertial navigation system, and/or a star-tracking system. The positioning system 414 may additionally or alternatively include various motion sensors (e.g., accelerometers, magnetometers, gyroscopes, and/or compasses).

Payload 400 may include a navigation system 416 separate from, or partially or fully incorporated into the control system 402. The navigation system 416 may implement station-keeping functions to maintain position within and/or move to a position in accordance with a desired topology or other service requirement. In particular, the navigation system 416 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the high-altitude balloon. In other embodiments, specific balloons may be configured to compute altitudinal and/or lateral adjustments for other balloons and transmit the adjustment commands to those other balloons.

The navigation system is able to evaluate data obtained from onboard navigation sensors, such as an inertial measurement unit (IMU) and/or differential GPS, received data (e.g., weather information), and/or other sensors such as health and performance sensors (e.g., a force torque sensor) to manage operation of the balloon's systems. When decisions are made to activate the lateral propulsion system, for instance to station keep, the navigation system then leverages received sensor data for position, wind direction, altitude and power availability to properly point the propeller and to provide a specific thrust condition for a specific duration or until a specific condition is reached (e.g., a specific velocity or position is reached, while monitoring and reporting overall system health, temperature, vibration, and other performance parameters).

Figure 5:
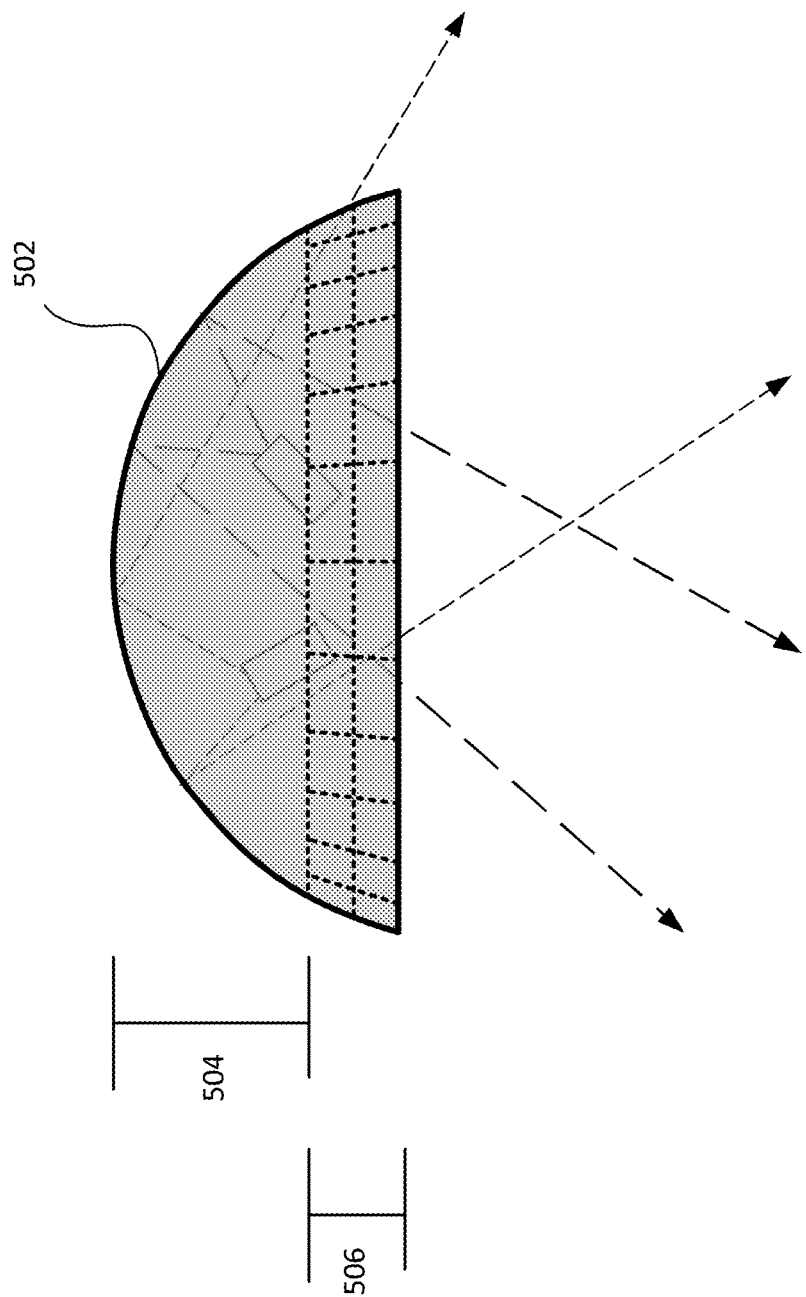
FIG. 5 is an example antenna system in accordance with aspects of the technology.

The antenna system may include a spherical reflector and one or more feeds. The shape of the spherical reflector may be a hemisphere (or 50% of a surface are of a sphere), or less than a hemisphere, such as 20% of a surface area of a sphere. In some implementations, the spherical reflector may be a whole sphere. An inner portion of the spherical reflector may be a reflective portion that is made of a material that reflects RF beams, such as beams having a frequency of 2100 MHz, 3500 MHz, or other frequency, and an outer portion arranged on the edge of the inner portion may be made of metamaterials that can be reflective or transparent to RF beams. As shown in FIG. 5, for spherical reflector 502, inner portion 504 is the reflective portion, and outer portion 506 is the metamaterials portion. The outer portion may comprise a plurality of sections that may be controlled independently of each other. For example, the outer portion 506 may be constructed of a plurality of metamaterials sections that can be independently controlled. Every metamaterials section may be a same shape, such as a curved rectangular piece, arranged to form a portion of a sphere for the outer portion of the spherical reflector 502. From the side view shown in FIG. 5, two rows of metamaterials sections are visible, with each row showing twelve sections. The opposite half may have the same configuration. In some alternatives, the metamaterials portion may be one or more sections of metamaterials that is controlled as one unit.

Figure 6:
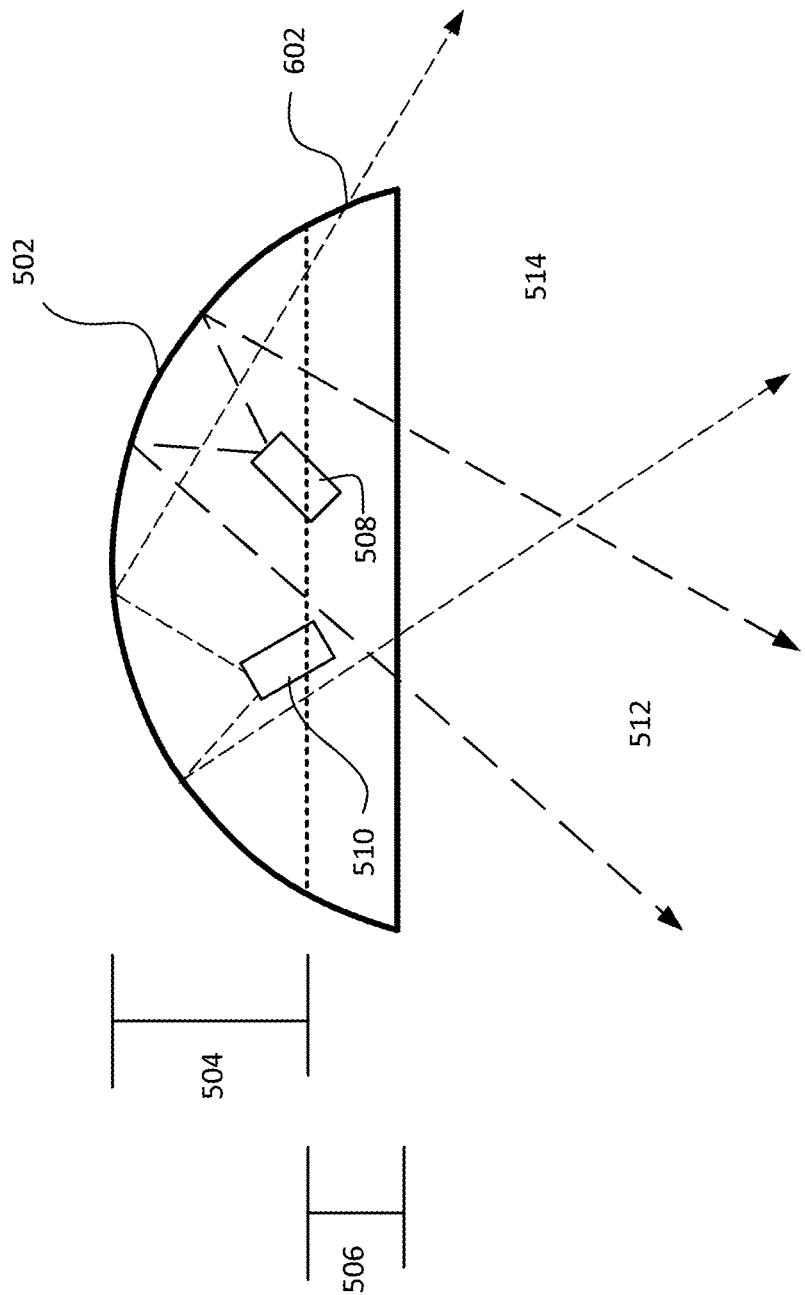
FIG. 6 is another view of the example antenna system of FIG. 5 in accordance with aspects of the technology.

The one or more feeds may include a first feed and a second feed. The first feed and the second feed may each be configured to emit an RF beam to be reflected off the spherical reflector. The first feed and the second feed may be configured to electronically steer the respective RF beams. In some implementations, the first feed and the second feed may also be configured to move independent of the other. As shown in FIG. 6, antenna system 420 has first feed 508 and second feed 510 configured to emit a first RF beam 512 and a second RF beam 514, respectively. For example, first feed 508 is configured to direct the first RF beam 512 towards spherical reflector 502. The first RF beam 512 is reflected off the spherical reflector 502 and out towards a first target location. The second feed 510 is configured to direct the second RF beam 514 towards spherical reflector 502. The second RF beam 514 is reflected off the spherical reflector 502 and out towards a second target location.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

One or more processors of the control system or one or more processors in the payload dedicated to controlling the one or more communication systems may determine one or more RF beams to be formed by the one or more feeds in the antenna system based on a location of the antenna system and one or more target locations. The one or more beams may be configured to reflect off the spherical reflector at least once and out into free space. Beam characteristics, such as a size, a shape, and a direction of each beam, may also be determined by the one or more processors. Beam characteristics may be determined based on the location of the antenna system, the one or more target locations, population density, history of demand, location or density of other terminals (terrestrial towers, other HAPs, etc.) providing coverage in or near the area, settings or constraints of the other terminals, regulations for the operation of a particular network, or other network factors. The one or more target locations may include locations in the geographic area or locations in the air. In particular, the one or more target locations may include locations of user equipment or terrestrial terminals in the geographic area or locations of airborne terminals. Additionally or alternatively, the one or more target locations include a region that is defined and selected based on population density, history of demand, location or density of other terminals (terrestrial towers, other HAPs, etc.) providing coverage in or near the area, settings or constraints of the other terminals, regulations for the operation of a particular network, or other network factors.

For example, the one or more processors 404 may determine that the first and second feeds 508, 510 are to form the respective RF beams 512, 514 based on a location of the payload carrying the antenna system 420 and the first and second target locations for the respective beams. The location of the payload may be determined using the positioning system 414. In this example, the location of the payload may be that of balloon 102B in FIG. 1, between ground-based station 106 and balloon 102E. From this location, the antenna system 420 may form link 108 with ground-based station 106 and/or link 104 with balloon 102E. The first RF beam 512 may be determined to be transmitted by the first feed 508 from a HAP terminal to a first location of the geographic area and a second RF beam 514 may be determined to be transmitted by the second feed 510 to a second location of an airborne terminal. The first location may be that of the ground-based station 106, and the second location may be the balloon 102E. The first RF beam may be configured to provide an access link of a network to one or more user equipment. The second RF beam may be configured to provide a backhaul link for the network. In some implementations, the second RF beam is a different frequency band than the first RF beam.

The one or more processors may determine one or more reflector sections and/or one or more transparent sections of the metamaterials portion of the spherical reflector for each RF beam to be formed the one or more feeds. For example, for the first RF beam 512, there may be no reflector sections and no transparent sections because the first RF beam 512 is planned to reflect off the inner portion 504 of the spherical reflector 502 and is not planned to intersect with any section of the spherical reflector after reflecting off the inner portion. For the second RF beam 514, there may be a plurality of transparent sections according to where the second RF beam 514 is determined to intersect with the spherical reflector at location 602 after reflecting off the inner portion 504. One or more metamaterials sections corresponding to the area the second RF beam 514 intersects with the metamaterials portion 506 may be determined to be the transparent sections based on a size, a shape, and a direction of the second RF beam.

The one or more processors may be configured to apply an electrical signal to one or more metamaterials sections to cause the one or more metamaterials sections to become reflective or transparent according to the one or more reflector sections and the one or more transparent sections. For example, an electrical signal may be applied to the area of the metamaterials portion 506 of spherical reflector 502 to cause the metamaterials in the area to become transparent when the second RF beam 514 is to be transmitted. At a later time, when the area is determined to be part of a reflector section, the electrical signal may be applied to cause the metamaterials in the area to become reflective.

In some scenarios, a configuration of the outer portion of metamaterials for the second RF beam may cause a disruption to the first RF beam. In other words, for the second RF beam to transmit to the second location, the first RF beam would not be able to transmit to the first location. For example, disruption may be predicted to be caused when at least a section of metamaterials is a transparent section for the second RF beam but a reflective section for the first RF beam. The one or more processors may determine that the one or more target locations may include the second location, and not the first location, at a given point in time. Alternatively, the one or more processors may determine that the second location takes priority over the first location at the given point in time. The one or more processors may ignore the first RF beam in determining the one or more reflector section and the one or more transparent sections for the second RF beam for the given point in time. The disruption to the first RF beam is inconsequential. In addition, the one or more processors may deactivate the first feed during the given point in time.

The one or more processors may then cause the antenna system to transmit the one or more RF beams. The first feed 508 may transmit the first RF beam 512, which is reflected off the inner portion 504 of the spherical reflector 502 and out through free space towards the ground-based station 106. The second feed 510 may transmit the second RF beam 514, which is reflected off the inner portion 504 of the spherical reflector 502. The second RF beam 514 is then reflected out partially through free space and partially through the one or more transparent sections of the metamaterials portion 506 of the spherical reflector 502 towards balloon 102E.

In some scenarios, the one or more processors may determine that there are no reflector sections and no transparent sections of the metamaterials portion for the one or more RF beams to be formed. For example, in one scenario, the one or more processors may determine that there is no intersection of any RF beam with the metamaterials portion of the spherical reflector. As a result, the one or more processors may cause the antenna system to transmit the one or more RF beams without making any changes to the metamaterials portion of the spherical reflector.

Figure 7:
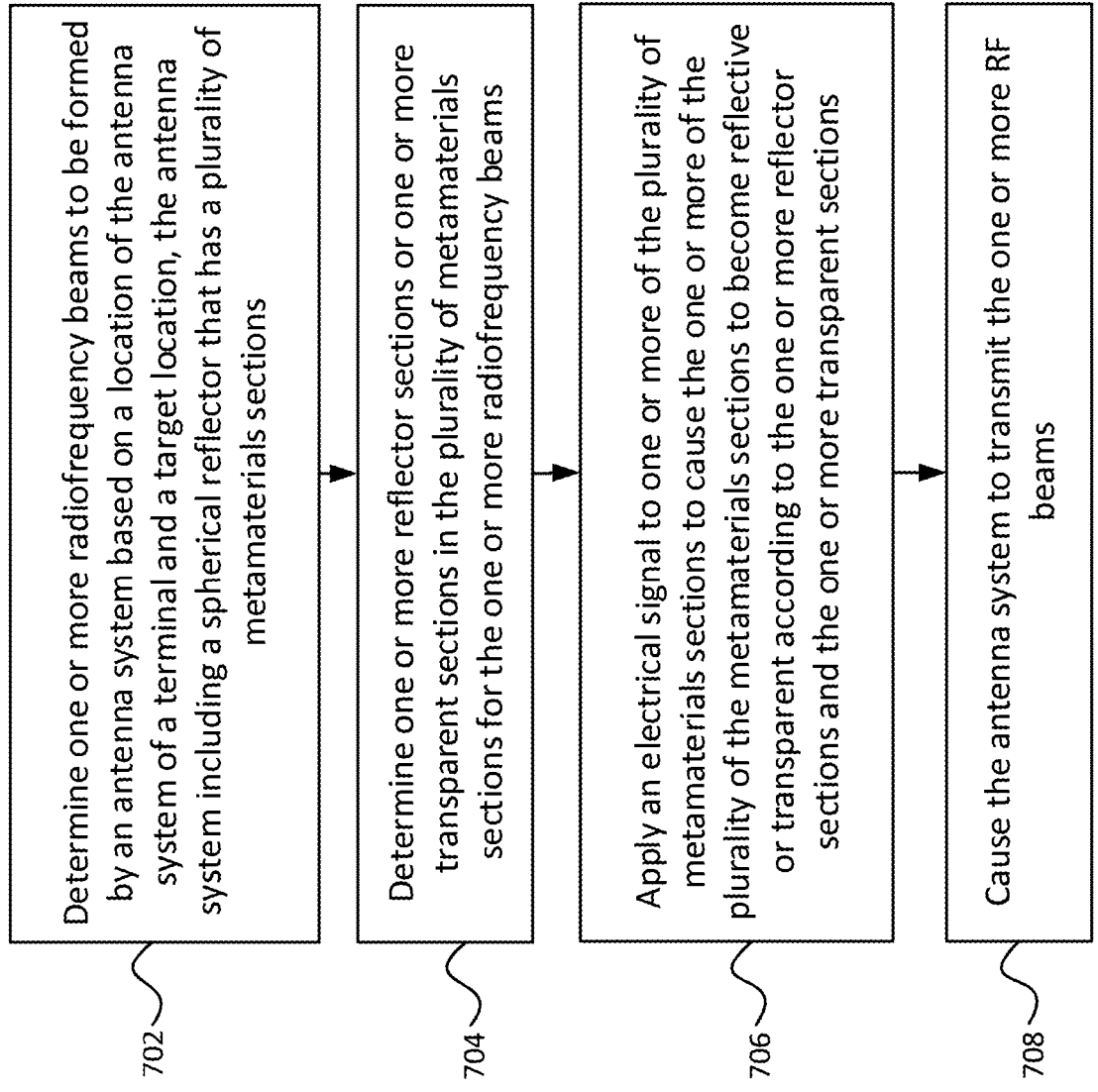
FIG. 7 is a flow diagram of a method in accordance with aspects of the technology.

FIG. 7 shows an example flow diagram in accordance with aspects of the technology. More specifically, FIG. 7 shows a flow of an example method 700 for controlling an antenna system having a spherical reflector that includes a plurality of metamaterials sections. At block 702, one or more processors may determine one or more RF beams to be formed by the antenna system of a terminal based on a location of the terminal and a target location. At block 704, the one or more processors may determine one or more reflector sections or one and/or one or more transparent sections in the plurality of metamaterials sections of the antenna system for the one or more RF beams. At block 706, the one or more processors may apply an electrical signal to one or more of the plurality of metamaterials sections to cause the one or more of the plurality of metamaterials sections to become reflective or transparent according to the one or more reflector sections and the one or more transparent sections. At block 708, the one or more processors may cause the antenna system to transmit the one or more RF beams.

The technology described herein may create an RF antenna system that has a wider range of coverage, such as an angular coverage area of greater than 100 elevational degrees (>±50 elevational degrees). Fewer moving parts may be used for the RF antenna system, which may lower the possible pointing errors of RF beams. In addition, a greater capacity for electronic steering means less need for repositioning the reflector, allowing for providing more continuous high gain. A larger geographic area may therefore be served by a single HAP terminal equipped with such an RF antenna system.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An antenna for wireless communication comprising:
   a spherical reflector including:
      an inner portion made of material that reflects radiofrequency (RF) beams, and
      an outer portion positioned on an edge of the inner portion, the outer portion being made of metamaterials that can be controlled to be reflective of or transparent to RF beams; and
   one or more feeds configured to form one or more RF beams reflected off the spherical reflector.

2. The antenna of claim 1, wherein the spherical reflector is less than a hemisphere.

3. The antenna of claim 1, wherein the antenna is part of a high-altitude platform.

4. The antenna of claim 1, wherein the outer portion of the spherical reflector is controlled using an electrical signal applied to at least a part of the outer portion.

5. The antenna of claim 1, wherein the outer portion of the spherical reflector includes a plurality of metamaterials sections.

6. The antenna of claim 5, wherein each metamaterials section of the plurality of metamaterials sections is independently controllable.

7. The antenna of claim 5, further comprising one or more processors configured to:
   form one or more RF beams using the one or more feeds, and
   control at least a part of the outer portion of the spherical reflector to reflect an RF beam of the one or more RF beams or be transparent to the RF beam based on the one or more RF beam.

8. The antenna of claim 7, wherein the one or more processors are further configured to determine one or more reflective sections of the plurality of metamaterials sections or one or more transparent sections of the plurality of metamaterials sections for each RF beam of the one or more RF beams.

9. The antenna of claim 7, wherein the at least a part of the outer portion of the spherical reflector is controlled based on a location of the antenna and one or more target locations.

10. The antenna of claim 9, wherein the one or more target locations includes a ground-based terminal and an airborne terminal.

11. A method for controlling an antenna system having a spherical reflector that includes a plurality of metamaterials sections, the method comprising:
- determining, by one or more processors, one or more radiofrequency (RF) beams to be formed by the antenna system based on a location of the antenna system of a terminal and a target location;
- determining, by the one or more processors, one or more reflector sections or one or more transparent sections in the plurality of metamaterials sections for the one or more RF beams;
- applying, by the one or more processors, an electrical signal to one or more of the plurality of metamaterials sections to cause the one or more of the metamaterials sections to become reflective of or transparent to an RF beam according to the one or more reflector sections and the one or more transparent sections; and
- causing, by the one or more processors, the antenna system to transmit the one or more RF beams.

12. The method of claim 11, wherein the determining of the one or more reflector sections or the one or more transparent sections is based on a location of the antenna system and one or more target locations.

13. The method of claim 12, wherein the one or more target locations includes a ground-based terminal and an airborne terminal.

14. The method of claim 11, wherein the electrical signal is a first electrical signal applied at a first point in time; and
- the method further comprises applying, by the one or more processors, a second electrical signal at a second point in time after the first point in time to switch the one or more of the metamaterials sections from reflective to transparent or from transparent to reflective.

15. The method of claim 11, further comprising:
- predicting, by the one or more processors, a disruption to a first RF beam based on a location of the one or more reflector sections or the one or more transparent sections corresponding to a second RF beam; and
- determining, by the one or more processors, to transmit the second RF beam at a given point in time when the first RF beam is not to be transmitted.

16. The method of claim 11, wherein the spherical reflector is less than a hemisphere.

17. The method of claim 11, wherein the spherical reflector is a whole sphere.

18. A non-transitory computer readable medium on which instructions are stored, the instructions, when executed by one or more processors in a high-altitude platform (HAP) node, cause the one or more processors to perform a method for controlling an antenna system, the method comprising:
- determining one or more radiofrequency (RF) beams to be formed by the antenna system based on a location of the HAP and a target location, the antenna system including a spherical reflector including a plurality of metamaterials sections;
- determining one or more reflector sections or one or more transparent sections in the plurality of metamaterials sections for the one or more RF beams;
- applying an electrical signal to one or more of the plurality of metamaterials sections to cause the one or more of the metamaterials sections to become reflective of or transparent to an RF beam according to the one or more reflector sections and the one or more transparent sections; and
- causing, the antenna system to transmit the one or more RF beams.

19. The medium of claim 18, wherein the electrical signal is a first electrical signal applied at a first point in time; and
- the method further comprises applying a second electrical signal at a second point in time after the first point in time to switch the one or more of the plurality of metamaterials sections from reflective to transparent or from transparent to reflective.

20. The medium of claim 18, wherein the method further comprises:
- predicting a disruption to a first RF beam based on a location of the one or more reflector sections or the one or more transparent sections corresponding to a second RF beam; and
- determining to transmit the second RF beam at a given point in time when the first RF beam is not to be transmitted.

* * * * *